(12) United States Patent
Rincker et al.

(10) Patent No.: US 8,306,504 B1
(45) Date of Patent: Nov. 6, 2012

(54) DETERMINING ACCESS TO A FEATURE OF A MOBILE DEVICE

(75) Inventors: Jason W. Rincker, Overland Park, KS (US); Harry H. Lai, Overland Park, KS (US); Christine Schumaker, Lenexa, KS (US); Allison A. DiMartino, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 406 days.

(21) Appl. No.: 12/640,699

(22) Filed: Dec. 17, 2009

(51) Int. Cl.
*H04M 1/66* (2006.01)
*H04M 1/68* (2006.01)
*H04M 3/16* (2006.01)
*G06F 13/00* (2006.01)
*G06F 21/00* (2006.01)
*G06F 13/28* (2006.01)
*G06F 7/04* (2006.01)
*G06F 15/16* (2006.01)
*G06F 17/30* (2006.01)
*G06F 12/00* (2006.01)
*G06F 12/14* (2006.01)
*H04L 29/06* (2006.01)
*G11C 7/00* (2006.01)

(52) U.S. Cl. ............ 455/411; 711/164; 713/182; 726/4; 726/21

(58) Field of Classification Search .................. 345/173; 455/410–411; 713/183, 182; 715/763, 810; 726/2–7, 16–18, 21, 26–28; 711/164
See application file for complete search history.

(56) References Cited

U.S. PATENT DOCUMENTS

| | | | | |
|---|---|---|---|---|
| 2005/0060554 | A1* | 3/2005 | O'Donoghue | 713/183 |
| 2009/0038006 | A1* | 2/2009 | Traenkenschuh et al. | 726/21 |
| 2011/0090097 | A1* | 4/2011 | Beshke | 341/20 |

OTHER PUBLICATIONS

Replacement Specification, p. 7, for U.S. Appl. No. 11/882,553 corresponding to US Pub. No. 2009/0038006 (Traenkenschuh et al).*

* cited by examiner

*Primary Examiner* — Dwayne Bost
*Assistant Examiner* — Larry Sternbane

(57) ABSTRACT

Methods are disclosed for determining, based on a pass code inputted by a user, whether the user can access a particular feature of a mobile device. Features may include access to the device itself, products, services, applications, or the like. The mobile device requests access to the feature, and is sent display information for a plurality of icons, which indicates where each icon is to be displayed. An ordered selection of icons is received to determine whether the ordered selection matches a predetermined ordered selection. If they match, the user is allowed to access the feature of the mobile device.

20 Claims, 8 Drawing Sheets

DETERMINING ACCESS TO A FEATURE OF A MOBILE DEVICE

SUMMARY

Embodiments of the invention are defined by the claims below, not this summary. A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, methods for determining whether a user has access to a feature of a mobile device, including the device itself, a portion of the device, a product, a service, an application, etc. The mobile device may send a request to a network server, for example, which determines where each of a number of icons is to be displayed on a display associated with the mobile device. User input of an ordered selection of icons is sent to the network server so that it can determine whether that ordered selection matches a predetermined ordered selection that is stored on the server or in some other database. If they match, the user is granted access to that feature.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| BTS | Base Transmittal Station |
| CDMA | Code Division Multiple Access |
| GPRS | General Packet Radio Service |
| GRE | Generic Routing Encapsulation |
| GSM | Global System for Mobile communications (Groupe Special Mobile) |
| IP | Internet Protocol |
| LED | Light Emitting Diode |
| PDA | Personal Data Assistant |
| TDMA | Time Division Multiple Access |
| UMTS | Universal Mobile Telecommunications System |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
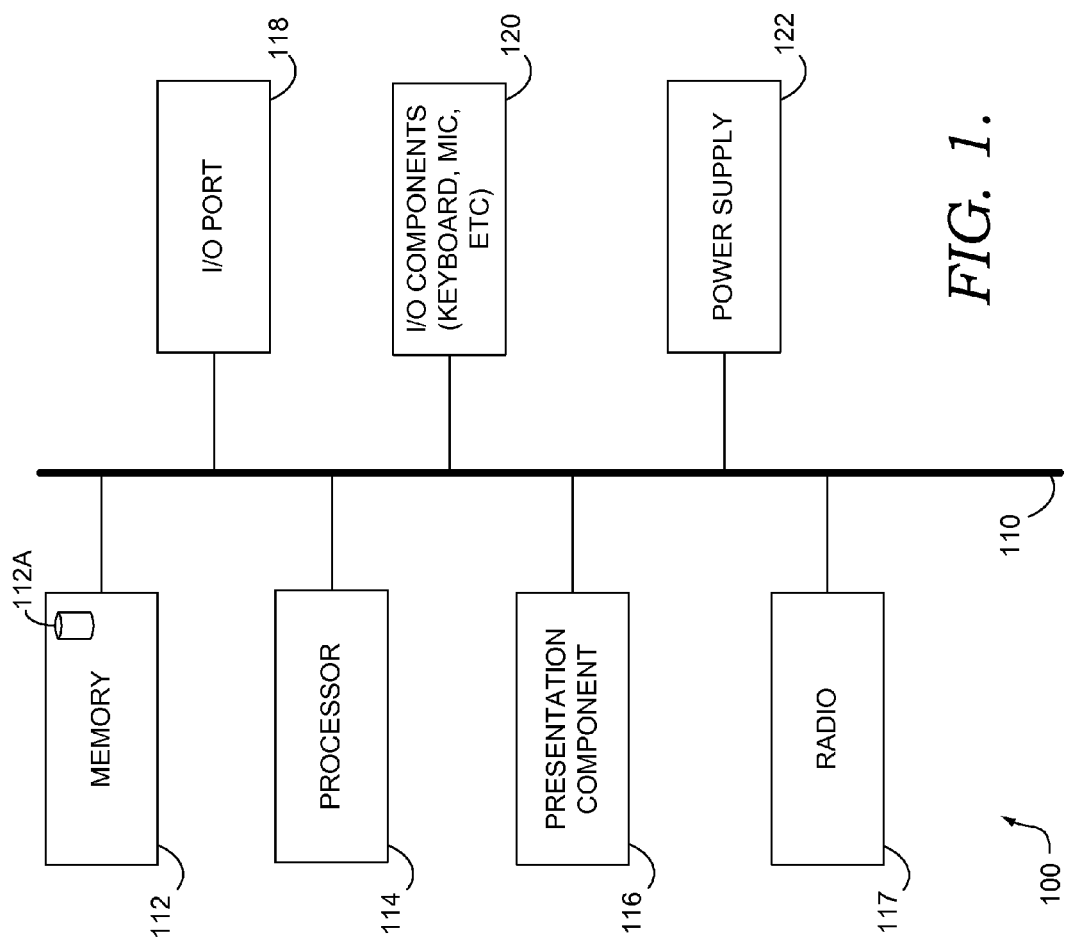
FIG. 1 depicts an illustrative device suitable for use in connection with an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. A mobile device may be one of many devices, including, but not limited to, a mobile phone, a laptop, a PDA, a handheld device, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information (e.g., a datastore 112A). Processor 114 might actually be multiple processors that receive instructions and process them accordingly. Presentation component 116 includes the likes of a display, a speaker, as well as other components that can present information (such as a lamp (LED), or even lighted keypads).

Radio 117 is a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keypads, microphones, touch screens, and any other item usable to directly or indirectly input data into mobile device 110. Power supply 122 includes items such as batteries, fuel cells, or any other component that can act as a power source to power mobile device 100.

Figure 2:
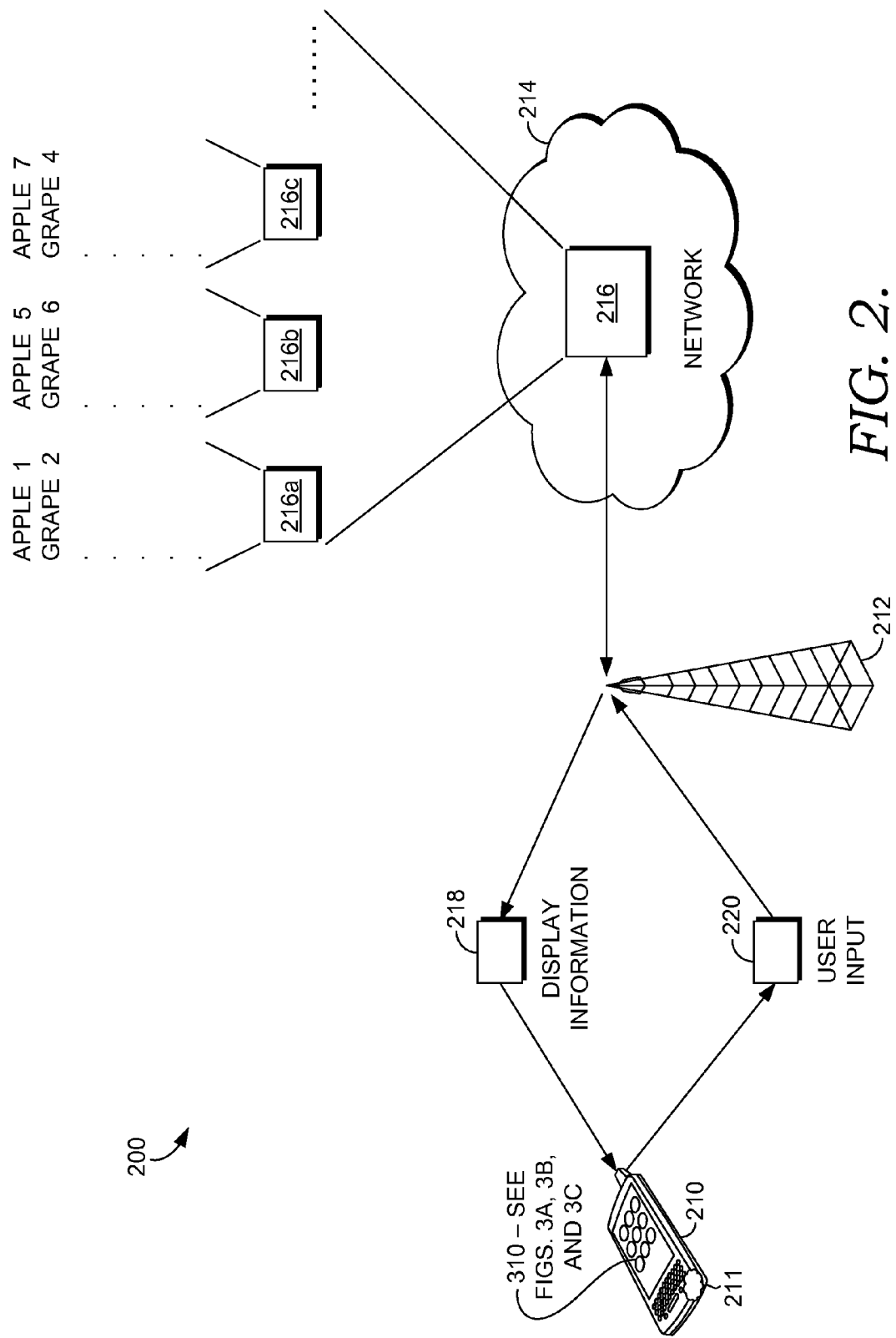
FIG. 2 depicts an illustrative operating environment suitable for practicing an embodiment of the present invention.

Turning now to FIG. 2, an illustrative operating environment is provided and referenced generally by the numeral 200, which depicts an illustrative networking environment for determining whether to grant access to a user of a particular feature associated with a mobile device. A feature may include many different aspects of a mobile device that require a user to enter a pass code in order for the user to access that feature. For exemplary purposes only and not limitation, a feature may include access to a mobile device (e.g., unlocking the mobile device), an application or service that can be accessed by way of a mobile device, a particular portion of a mobile device that can be locked (e.g., by way of a parental lock), account information associated with the mobile device, purchasing the use of applications or services or products (e.g., games, ringtones), purchasing a product or service when the mobile device is used similar to a credit card, etc. There are many more examples, as the list above is not exhaustive. The features above are provided as examples, and are not intended to limit the types of features used in conjunction with embodiments of the present invention.

Mobile device 210 is the type of device described in connection with FIG. 1 in one embodiment and may include a client application, such as client application 211, that helps carry out aspects of the technology described herein. More specifically, client application 211 may store various icons that have been chosen by a user who is associated with the mobile device 210. For instance, a user may have the opportunity to choose a theme having two or more associated icons that can be used as a means for a user to access a particular feature associated with the mobile device 210, as described above. The client application 211 may also be responsible for determining a display order of the icons on the display of the mobile device 210. Further, in one instance, the client application 211 may compare user input to a predetermined ordered selection of icons to determine whether the correct icons in the correct order have been entered by the user. Whenever we speak of an application, software, or the like, we are really referring to one or more computer-readable media that is embodied with a set of computer-executable instructions that facilitate various actions to be performed. We will not always include this lengthy terminology because doing so would make this document more difficult to read.

The mobile device 210 communicates data to and receives data from a network 214 by way of a base transmittal station 212 (BTS) using a wireless link. The network 214 includes a server 216, which, in one instance, produces and stores various icons to value combinations. In the embodiment of FIG. 2, the values represent a location of the icon on the display 310 of the mobile device 210. For instance, lists 216a, 216b, and 216c illustrate exemplary combinations of icons and locator values. In this instance, a user has chosen fruit as a theme, and as such, various types of fruit are represented by icons. These may include, for example, an apple, grapes, banana, kiwi, orange, strawberry, cherries, peach, etc. List 216a includes "apple" associated with locator value "1" and "grapes" associated with locator value "2." The display corresponding to list 216 may resemble the display shown in FIG. 3A. While the name of the icon is shown in FIG. 2 (e.g., apple, grapes), an icon value may be used instead of the name of the icon. Each icon may have an associated icon value that uniquely identifies the icon, and this value may be different than the locator value. As such, lists 216a, 216b, and 216c may include icon values and associated locator values.

Figure 3A:
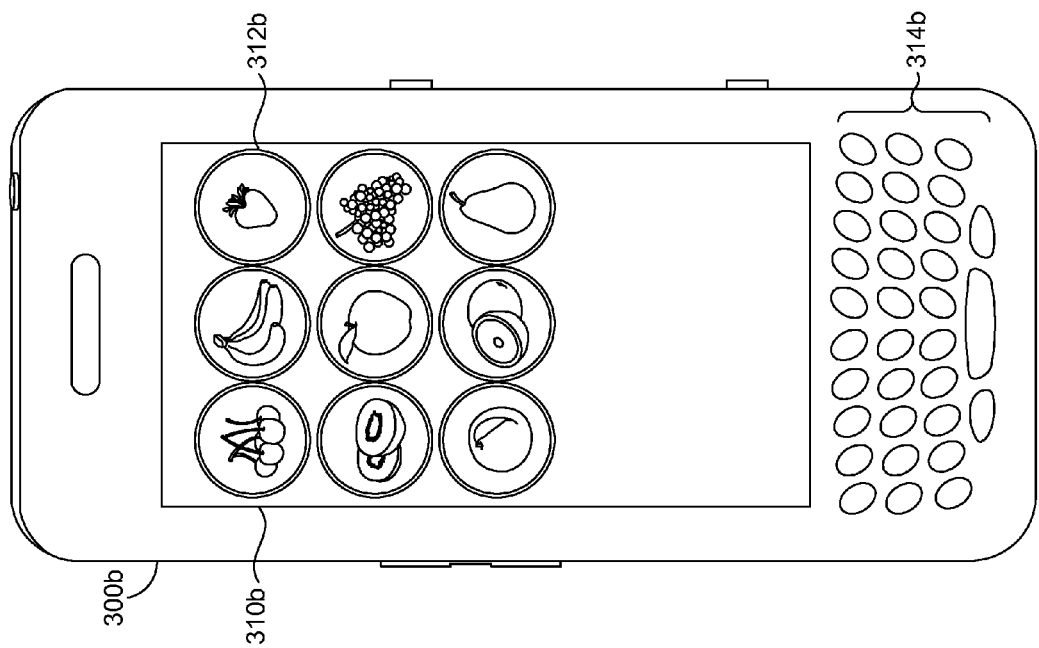
FIGS. 3A-3C depict illustrative icon configurations on a display of a mobile device.

FIG. 3A is just one embodiment of how icons are represented on a display according to locator values. FIG. 3A is a mobile device 300a having a display 310a and a plurality of icons 312a. A keypad 314a is also shown. Keypads typically have the numbers 1, 2, and 3 on a single line. Beneath this line may be the numbers 4, 5, and 6, and beneath that may be the numbers 7, 8, and 9. The embodiment of FIG. 3A illustrates the icons in this way. As shown in list 216a of FIG. 2, "apple" has a corresponding locator value of "1." As such, an icon of an apple is displayed in FIG. 3A in the "1" position. Similarly, as "grapes" has a corresponding locator value of "2," an icon of grapes is displayed in FIG. 3A in the "2" position. This allows for a user to press the number "1" on the keypad, and for the mobile device to understand which icon the user has selected.

Figure 3B:
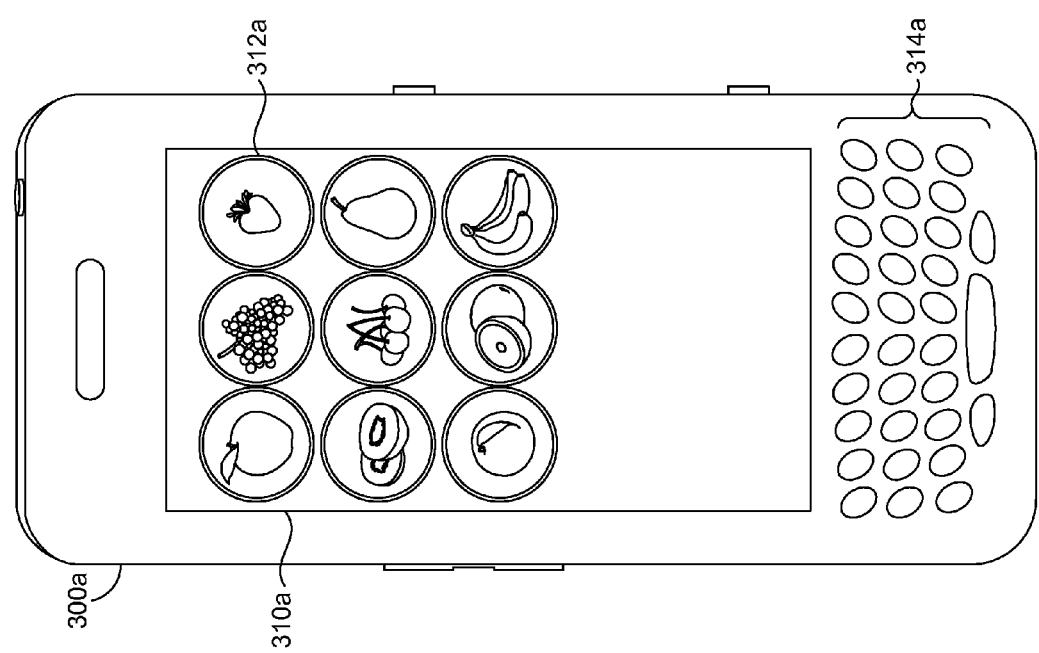
Figure 3C:
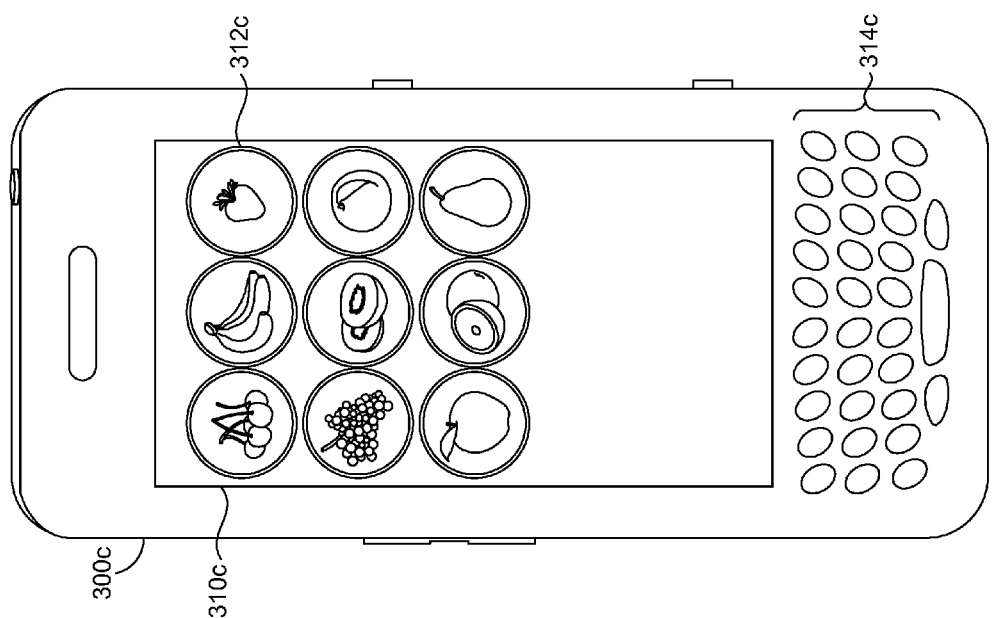

Likewise, FIG. 3B illustrates a display corresponding to list 216b in FIG. 2, and FIG. 3C illustrates a display corresponding to list 216c. FIG. 3B is a mobile device 300b having a display 310b, a plurality of icons 312b, and a keypad 314b. The icons 312b are arranged according to list 216b in FIG. 2, as the icon of an apple is in the "5" position and the icon of grapes is in the "6" position. FIG. 3C is a mobile device 300c having a display 310c, a plurality of icons 312c, and a keypad 314c. The icons 312c are arranged according to list 216c in FIG. 2, as the icon of an apple is in the "7" position and the icon of grapes is in the "4" position. Again, if a user selects, on a keypad, the number "7" the mobile device can translate this user input into which icon the user has selected, which here is the apple icon.

Referring back to FIG. 2, information is illustrated as passing to and from the mobile device 210 from the network 214 through the BTS 212. In one embodiment, the server 216 is responsible for determining a display order of the icons on the mobile device. As such, the server sends display information 218 to the mobile device 210. A user may then make a selection of icons in a particular order, which can be compared to a predetermined ordered selection of icons. Once selected, this user input 220 is communicated back to the network 214 and the server 216 may compare the user's selection to a predetermined ordered selection of icons. If they match, the user may be granted access to a particular feature of the mobile device. The predetermined ordered selection of icons may have been chosen by the user, or may have been selected by a component of the served provider's network.

In a similar embodiment to that of FIG. 2, the server may store not only icon to locator value information, but may also store icon to icon value information. Each icon may have a corresponding value that uniquely identifies the icon. The icon value, in one embodiment, is a different value than the locator value. While the locator value indicates a location of the icon on the display of the mobile device, the icon value identifies the icon itself. As such, lists 216a, 216b, and 216c may list icons and associated locator values, and may also list icons and associated icon values. Doing so may prevent a third party (e.g., hacker, spy) from viewing the information being sent across the network and from that, identifying the user's password, such as the graphic code or graphic personal identification number (PIN). Thus, in one embodiment, the server 216 and the client application 211 on the mobile device 210 may both store icon information, such as the particular icons that are associated with a particular user, and the icon values associated with those icons.

While the embodiments described above utilize the server 216 on the network 214 to determine display information and to determine whether the user is granted access to a particular feature on the mobile device 210, other embodiments utilize the client application 211 to perform one or more of these steps. For instance, the client application 211 may have the intelligence to store the predetermined ordered selection of icons, which may be chosen by the user or by a component of the service provider's network, so that the client application 211 can compare the ordered selection of icons to the predetermined ordered selection and determine whether the user is granted access to the feature of the mobile device 210.

As mentioned, the client application 211 may also determine display information for the icons. In this embodiment, once the icons are displayed on the display of the mobile device in an order determined by the client application 211, the user makes an ordered selection of icons, and this information is communicated to the server 216. The server 216 then determines whether the user can access the feature associated with the mobile device 210 by comparing the user's selection to a selection previously made either by the user or by the service provider. In one instance, the user is given an opportunity to select icons in a particular order that makes sense to that user. This assists the user in remembering this ordered selection for when the user is prompted to make an ordered selection of icons to access a feature associated with the mobile device 210. The server 216 communicates a message back to the client application 211 on the mobile device 210 indicating whether the user can access the feature that the user is attempting to access. As described above, the feature may include a variety of aspects of a mobile device, including, but certainly not limited to, the mobile device itself (e.g., unlocking the device), a purchased or downloaded application, service, or product, a locked portion of the mobile device (e.g., a portion is locked due to a parental lock on the device), or account information associated with the mobile device.

Figure 4:
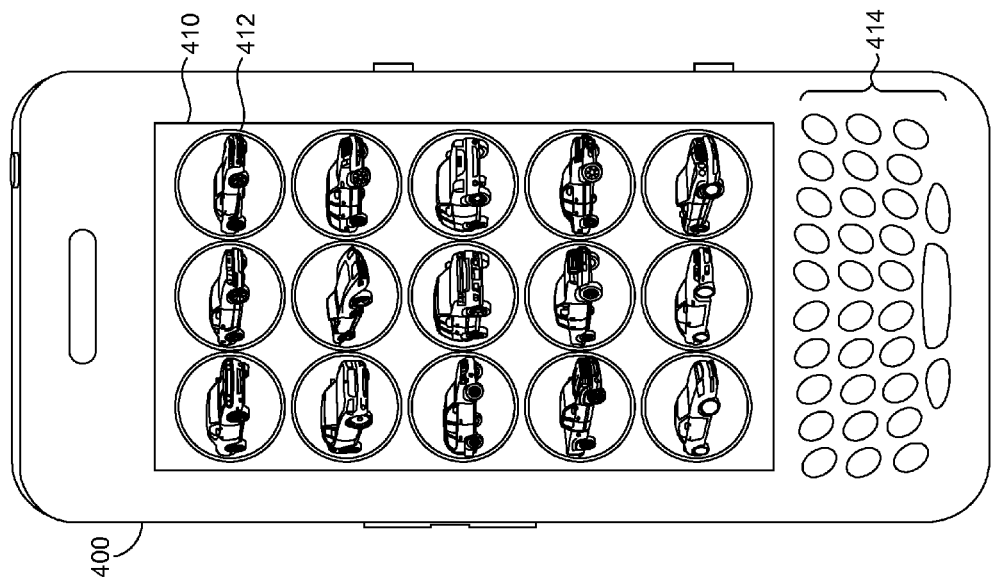
FIG. 4 depicts an illustrative icon configuration on a display of a mobile device.

Turning now to FIG. 4, an illustrative icon configuration of a display 410 of a mobile device 400 is shown. Initially, the display 410 has a plurality of icons 412. As mentioned, icons may be associated with a numerical value, such as one through nine, so that a user can make an icon selection using a keypad, such as keypad 414. In some embodiments, however, more than nine icons may be displayed, and thus it may not be as feasible for a user to enter double digit numbers into keypad to represent numbers above nine. In these embodiments, touch screen devices allow a user to simply touch the icon that the user wishes to select. While the icon may still have an associated value, such as an icon value, as described above, the icon values may not correspond to numbers on the keypad 414, and therefore a touch screen device is useful in these circumstances. Unlike the embodiments of FIGS. 3A-3C where nine icons are displayed, the embodiment of FIG. 4 has 15 icons, each representing a different type (e.g., different make, different model, different year) of vehicle. The user may have a particular association or liking to various types of vehicles, and therefore may have chosen a car theme so that different types of cars are used as the icons for the user's pass code or PIN to access various features associated with the mobile device.

Figure 5:
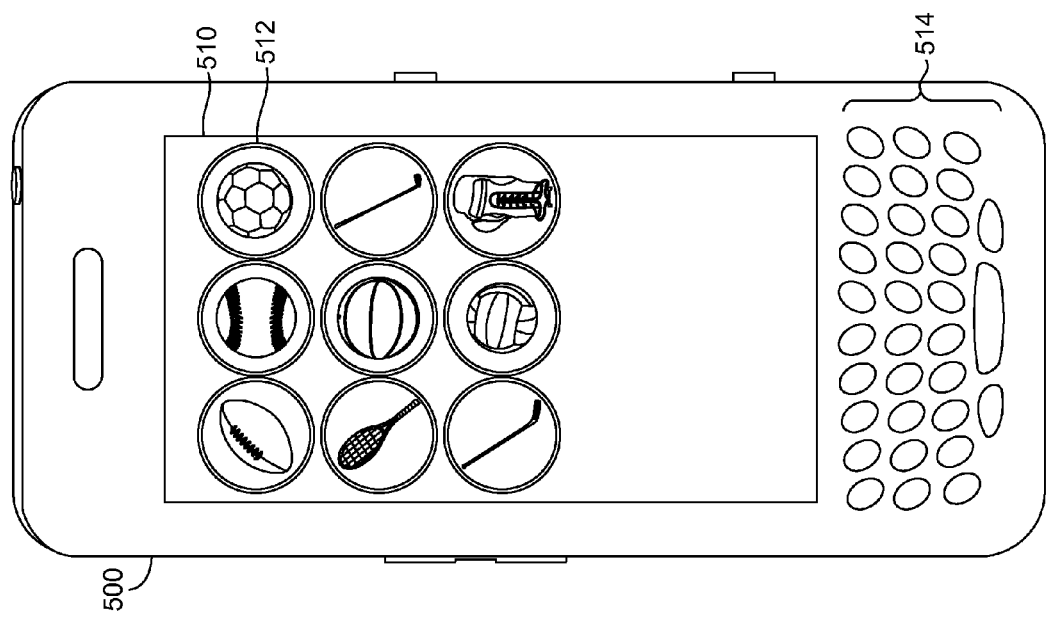
FIG. 5 depicts an illustrative icon configuration on a display of a mobile device.

FIG. 5 illustrates another icon configuration of a display 510 of a mobile device 500. The display 510 has a plurality of icons 512. Here, the icons are different sports paraphernalia. The number of icons may be irrelevant, as various themes from which the user can choose may contain different numbers of icons. Further, the type of icons (e.g., sports, cars, fruit, cartoon characters, uploaded pictures of family and friends) is also irrelevant. Here, a keypad 514 is provided so that as described above, the user may enter an ordered selection of icons into the device by using the keypad 514.

Figure 6:
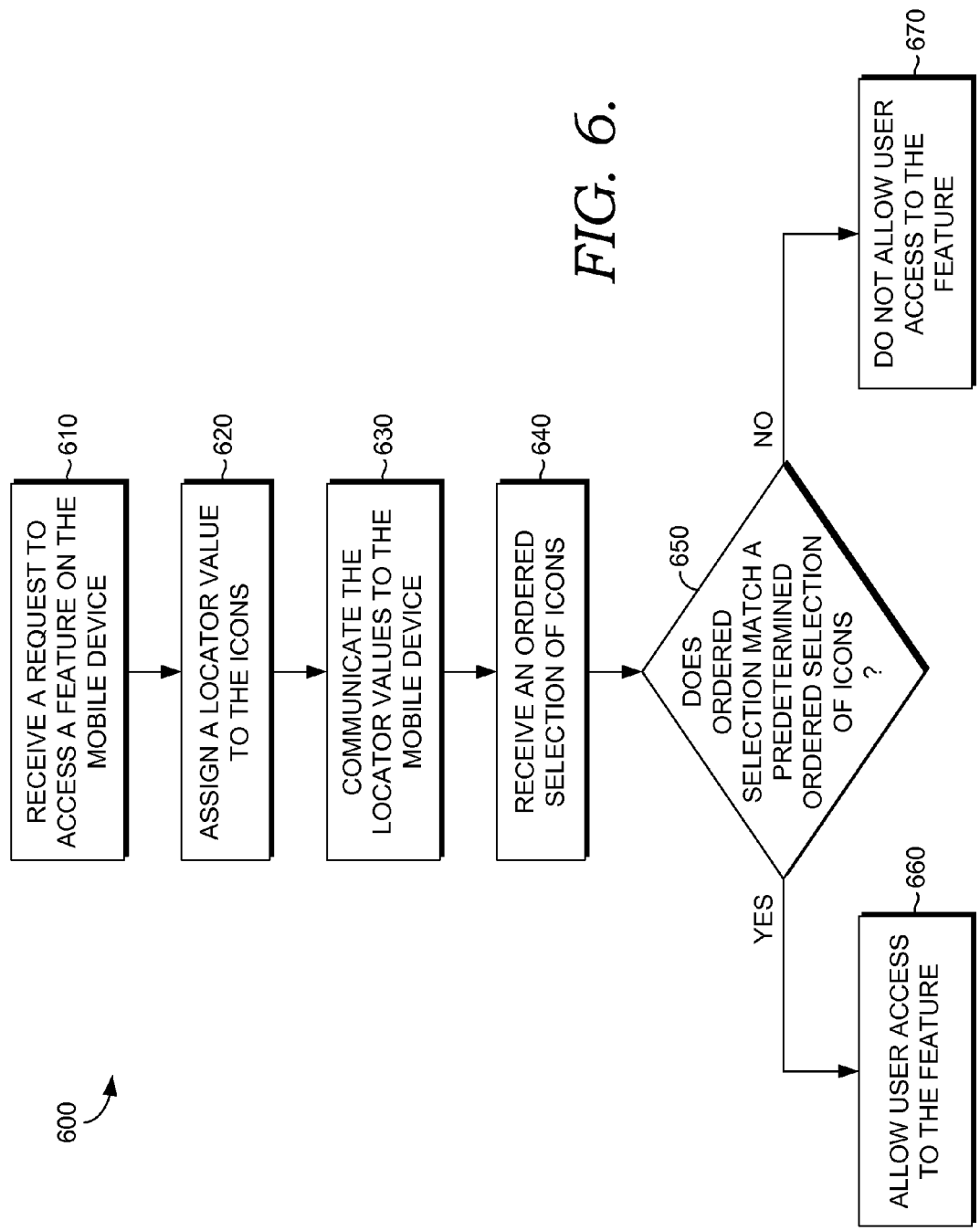
FIGS. 6-8 depict flow diagrams of a method for determining whether to provide a user access to a particular feature associated with a mobile device based on a graphic code inputted by the user.

Turning now to FIG. 6, a method 600 for determining whether to provide a user access to a particular feature associated with a mobile device based on a graphic code inputted by the user is shown. Initially, a request to access a feature on the mobile device is received at step 610. In one instance, this request is received by the mobile device itself, such as by a client application located on the mobile device. As mentioned, a user may attempt to access a feature on a mobile device in various circumstances. The feature may include a variety of aspects of a mobile device, including, but certainly not limited to, the mobile device itself (e.g., unlocking the device), a purchased or downloaded application, service, or product, a locked portion of the mobile device (e.g., a portion is locked due to a parental lock on the device), or account information associated with the mobile device. At step 620, a locator value is assigned to each of a plurality of icons. The locator value generally indicates a display location of the corresponding icon on a display of the mobile device. The icons, in one instance, belong to a particular theme that may have been chosen by the user. For instance, a fruit theme may correspond to icons of different types of fruit, as shown in FIGS. 3A-3C. A car theme may correspond to different types of cars, as shown in FIG. 4, or a sports theme may correspond to different sports paraphernalia, as shown in FIG. 5.

In one embodiment, the locator values correspond to the numerical values one through nine, and therefore a user without a touch screen device may enter the numbers of the icons into a keypad. The user would know the locator value by the location of the icon on the display. As shown in FIGS. 3A-3C, for example, the three icons on the uppermost portion of the display may, in one embodiment, correspond to numerical values one through three starting from left to right. The middle icons may correspond to numerical values four through six, and the lowermost icons may correspond to numerical values seven through nine. Other arrangements of icons are certainly possible.

At step 630, the locator values for each of the icons are communicated to the mobile device (e.g., the client application), which allows for the icons to be displayed on the display of the mobile device according to an order determined by the network server, for example. An ordered selection of icons is received at step 640. User input may take the form of an ordered selection of icons, which, as mentioned earlier, may be the user's pass code or PIN to access various features of a mobile device. In one instance, the user previously viewed the icons and selected, in a particular order, two or more icons to be used as that user's code. This code may be unique to that user. The code may comprise two icons, or may comprise more than two icons. Further, the ordered selection of icons may include the same icon being selected more than once. For example, in FIG. 3A, a user may select as a code apple, grapes, cherries, then apple. At step 650, it is determined whether the ordered selection of the icons matches a predetermined ordered selection of icons. In one embodiment, this determination is made by the network server. If they match, the network server communicates to the mobile device at step 660 that the user is allowed to access the feature. But if they don't match, the network server communicates at step 670 that the user is not allowed to access the feature.

Figure 7:
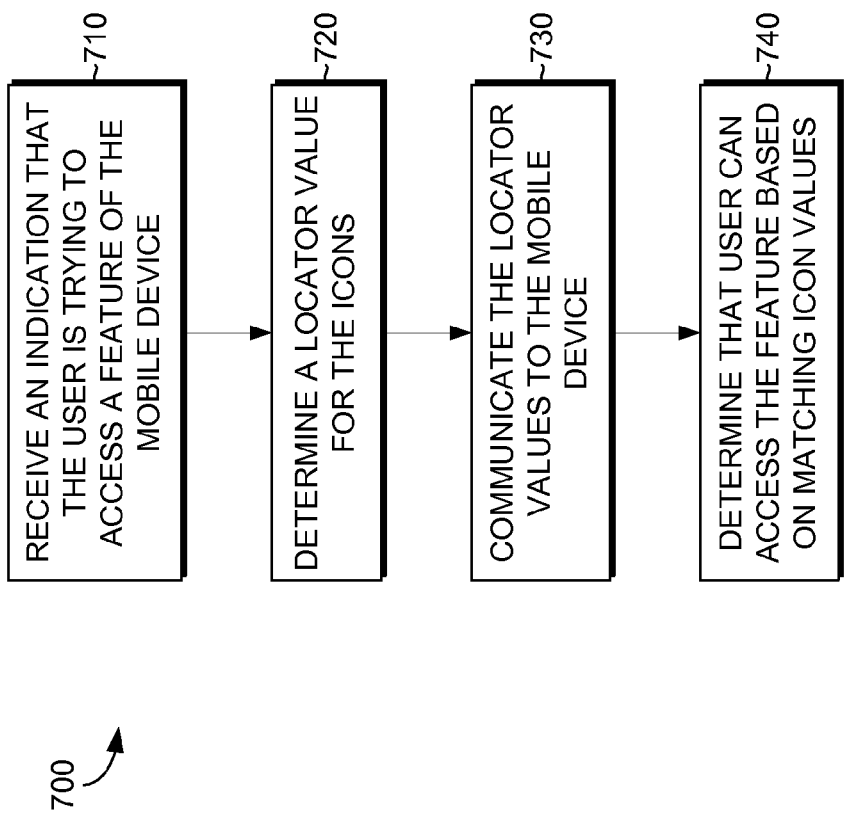

FIG. 7 illustrates another method 700 for determining whether to provide a user access to a particular feature associated with a mobile device based on a graphic code inputted by the user. Initially, at step 710, an indication is received that the user is attempting to access a feature associated with the mobile device. A locator value is then determined for the icons at step 720, which indicates a display order of the icons on a display of the mobile device. As described herein, the locator values may correspond to numerical values, and the network server and the mobile device (e.g., client application) may both know that a certain numerical value corresponds to a certain location on a display. In one embodiment, as shown in FIGS. 3A-3C, a top row of three icons may correspond to values one through three, a middle row may correspond to values four through six, and a bottom row may correspond to values seven through nine.

At step 730, the locator values are communicated to the mobile device for presentation of the icons to the user on the display. It is then determined, at step 740, whether the user can access the feature associated with the mobile device, which the user has attempted to access. This determination may include receiving a series of icon values from the network server, for example, that represents an ordered selection by the user of one or more of the plurality of icons. The ordered selection, in one instance, includes two or more of the same icon value, thereby indicating that the user has selected the same icon two or more times. Each icon may be associated with an icon value that uniquely identifies the icon. In one embodiment, the location value is different than the icon value. The icon values may have been previously assigned to each icon, and a list of icon values and associated icons may be stored in the mobile device such that the device can translate location values into icon values. Further, the use of icon values allows different types of information to be communicated back and forth between the mobile device and the network so that a spy looking at this information is unable to reconcile the user's pass code.

The determination may also include accessing a database to locate a predetermined series of icon values so that they can be compared to the series of icon values selected by the user. If they match, the network server communicates to the mobile device that the user is allowed to access the feature of the mobile device.

Figure 8:
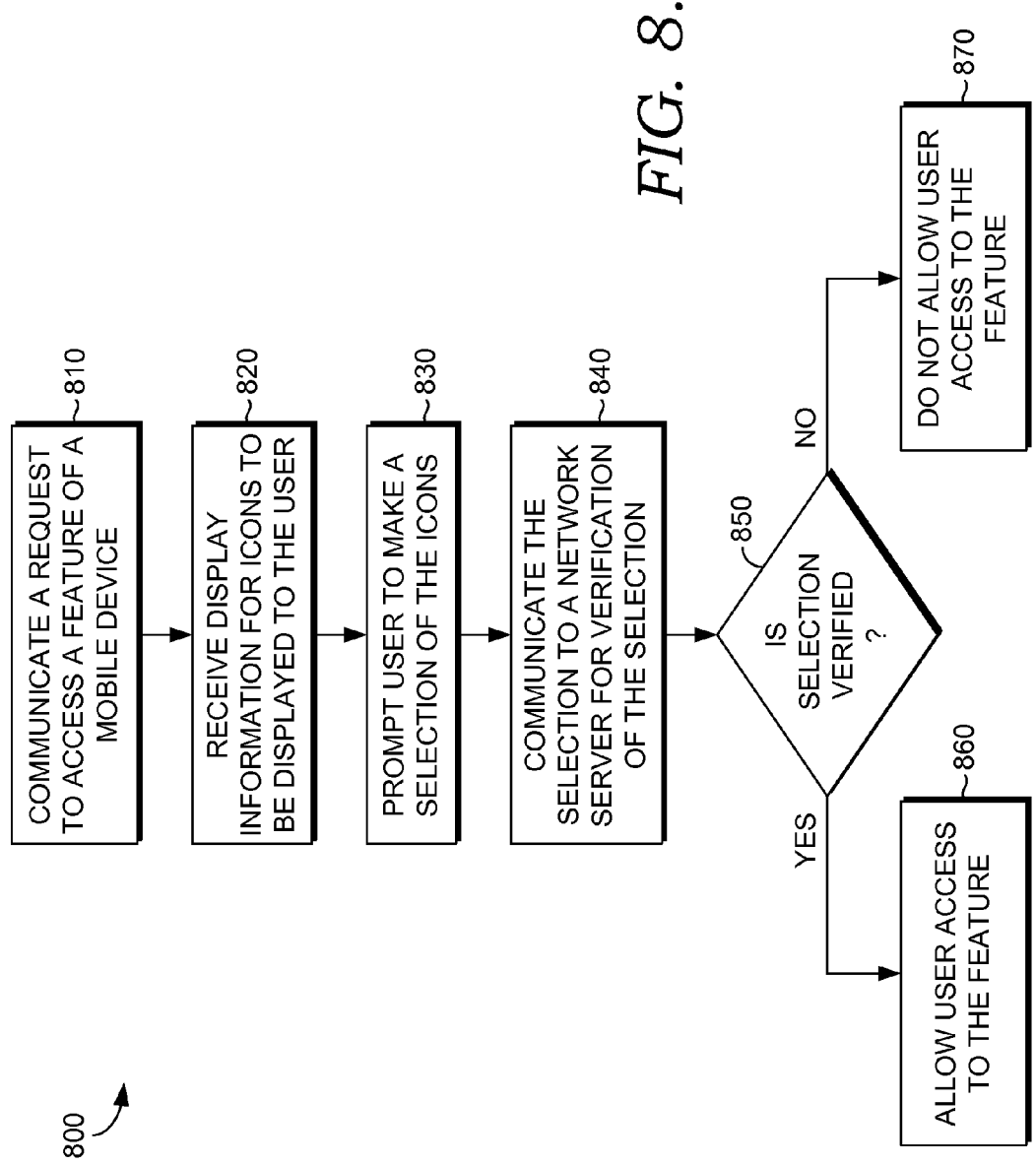

Referring now to FIG. 8, another method 800 is shown for determining whether to provide a user access to a particular feature associated with a mobile device based on a graphic code inputted by the user. At step 810, a request is communicated to a network, for example, that indicates that a user is attempting to access a particular feature associated with the mobile device that requires a pass code. At step 820, display information is received that includes a locator value for each icon. These icons may have been previously selected by a user, such as if the user has selected a certain theme that has associated icons (e.g., fruit theme has icons of different fruit). The icons are displayed on a display associated with the mobile device, and the user is prompted to make an ordered selection of the icons in order to access the feature that requires a user to enter a pass code.

A user is them prompted to make a selection of icons at step 830, and upon the user making the selection, the selection is communicated to a network server at step 840 for verification of the selection. The verification includes comparing the ordered selection of icons to a predetermined ordered selection of icons, which may have been previously selected by the user, or may have been set by the service provider. If set by the service provider, the user would have been given the pass code comprising two or more icons. At step 850, it is determined whether the ordered selection has been verified. If it has been verified (e.g., the predetermined ordered selection matches the ordered selection), the user is allowed access to the feature, shown at step 860. If it has not been verified, step 870 indicates that the user is not allowed to access the feature.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed by a network component, perform a method of determining whether to provide a user access to a particular feature associated with a mobile device based on a graphic code inputted by the user, the method comprising:
  receiving a request indicating that the user is attempting to access a feature associated with the mobile device;
  at the network component, assigning a locator value to each of a plurality of icons, the locator value indicating a display location of the corresponding icon on a display of the mobile device;
  communicating the locator value for each of the plurality of icons to the mobile device thereby allowing for an ordered display of the plurality of icons on the display;
  receiving user input of an ordered selection of one or more of the plurality of icons; and
  determining whether the ordered selection of the one or more of the plurality of icons matches a predetermined ordered selection of the plurality of icons, wherein,
    (1) if the ordered selection matches the predetermined ordered selection, communicating that the user is allowed to access the feature associated with the mobile device, and
    (2) if the ordered selection does not match the predetermined ordered selection, communicating that the user is not allowed to access the feature associated with the mobile device.

2. The media of claim 1, wherein the feature is one or more of,
  (1) the mobile device itself,
  (2) a purchased or downloaded application, service, or product,
  (3) a locked portion of the mobile device, or
  (4) account information associated with the mobile device.

3. The media of claim 1, wherein the request is received from a client application located on the mobile device.

4. The media of claim 1, wherein the plurality of icons correspond to a particular theme chosen by the user.

5. The media of claim 1, wherein the user has previously viewed the plurality of icons and selected, in a particular order, two or more icons to be used as a code that is unique to that user.

6. The media of claim 1, wherein the ordered selection includes two or more of the same icon.

7. The media of claim 1, wherein the locator values correspond to a numerical value such that the user input can be made by way of a keypad associated with the mobile device.

8. The media of claim 7, wherein the location of the plurality of icons indicates to the user the numerical value with which each of the plurality of icons corresponds.

9. The media of claim 1, wherein the user input of the ordered selection is made by way of a touch screen display.

10. The media of claim 1, wherein the plurality of icons are positioned on the display of the mobile device in consecutive rows of three icons each.

11. Non-transitory computer-readable media having computer-executable instructions embodied thereon that, when executed by a network component, perform a method of determining whether to provide a user access to a particular feature associated with a mobile device based on a graphic code inputted by the user, the method comprising:

- receiving an indication that the user is attempting to access a feature associated with the mobile device;
- at the network component, determining a locator value for each of a plurality of icons, the locator values indicating a display order of the plurality of icons on a display of the mobile device;
- communicating the locator values to the mobile device for presentation of the plurality of icons to the user; and
- determining that the user can access the feature associated with the mobile device, the determining including,
  (1) receiving a series of icon values that represents an ordered selection by the user of one or more of the plurality of icons, wherein each of the plurality of icons is associated with an icon value that uniquely identifies the icon, and
  (2) accessing a database to determine that the series of icon values matches a predetermined series of icon values, thereby allowing the user to access the feature associated with the mobile device.

12. The media of claim 11, further comprising assigning the icon value to each of the plurality of icons.

13. The media of claim 11, wherein the feature is one or more of,
  (1) the mobile device itself,
  (2) a purchased or downloaded application, service, or product,
  (3) a locked portion of the mobile device, or
  (4) account information associated with the mobile device.

14. The media of claim 11, wherein the series of icon values are inputted by the user by way of a keypad associated with the mobile device.

15. The media of claim 11, wherein the plurality of icons are displayed in such a way as to indicate to the user a corresponding numerical value associated with the icons, wherein the user inputs the corresponding numerical value into the keypad when making a selection of icons.

16. The media of claim 11, wherein the mobile device determines from the locator values the icon values to communicate to a network server.

17. The media of claim 11, wherein the ordered selection includes two or more of the same icon value, thereby indicating that the same icon was selected two or more times.

18. The media of claim 11, wherein the predetermined series of icon values is determined by the user of the mobile device.

19. Non-transitory computer-readable media having computer-executable instructions embodied thereon that, when executed by a mobile device on a network, perform a method of determining whether to provide a user access to a particular feature associated with a mobile device based on a graphic code inputted by the user, the method comprising:

- communicating to a network server a request indicating that the user, by way of the mobile device, is attempting to access a particular feature associated with the mobile device that requires a pass code;
- receiving display information from a network component that includes a locator value for each of a plurality of icons that have previously been selected by the user, wherein the locator value for each of the plurality of icons is assigned by the network, and wherein the plurality of icons are displayed according to the assigned locator value on a display of the mobile device and the user is prompted to make an ordered selection of the icons to access the particular feature associated with the mobile device that the user is attempting to access;
- prompting the user to make the ordered selection of the icons to access the particular feature associated with the mobile device that the user is attempting to access;
- upon the user making the ordered selection, communicating the ordered selection to the network server for verification of the ordered selection, wherein the verification includes comparing the ordered selection to a predetermined ordered selection of the icons; and
- receiving an indication as to whether the ordered selection is verified, wherein,
  (1) if the ordered selection is verified, allowing the user to access the particular feature associated with the mobile device, and
  (2) if the ordered selection is not verified, not allowing the user to access the particular feature associated with the mobile device.

20. The media of claim 19, wherein the feature is one or more of,
  (1) the mobile device itself,
  (2) a purchased or downloaded application, service, or product,
  (3) a locked portion of the mobile device, or
  (4) account information associated with the mobile device.

* * * * *